United States Patent [19]

Maeda

[11] Patent Number: 5,385,592
[45] Date of Patent: Jan. 31, 1995

[54] FILTER DEVICE FOR COMPRESSED AIR

[75] Inventor: Sadao Maeda, Okazaki, Japan

[73] Assignee: Maeda Limited, Japan

[21] Appl. No.: 90,179

[22] PCT Filed: May 20, 1993

[86] PCT No.: PCT/JP93/00664

§ 371 Date: Jul. 22, 1993

§ 102(e) Date: Jul. 22, 1993

[87] PCT Pub. No.: WO93/23146

PCT Pub. Date: Nov. 25, 1993

[30] Foreign Application Priority Data

May 20, 1992 [JP] Japan ................... 4-152692

[51] Int. Cl.⁶ ................... B01D 46/12; B01D 45/12
[52] U.S. Cl. .......................... 55/323; 55/329;
55/337; 55/399; 55/DIG. 17
[58] Field of Search ............... 55/322, 323, 337, 398,
55/399, DIG. 17, 219, 318-320, 329, 330, 332, 333

[56] References Cited

U.S. PATENT DOCUMENTS

| | | | |
|---|---|---|---|
| Re. 32,989 | 7/1989 | Mann | 55/323 |
| 3,386,230 | 6/1968 | Riesberg et al. | 55/337 |
| 3,876,400 | 4/1975 | Frantz | 55/337 X |
| 4,141,700 | 2/1979 | Norton et al. | 55/337 |
| 4,162,906 | 7/1979 | Sullivan et al. | 55/337 X |
| 4,487,618 | 12/1984 | Mann | 55/323 |
| 4,514,193 | 4/1985 | Booth | 55/337 X |
| 4,516,994 | 5/1985 | Kocher | 55/337 |
| 4,537,608 | 8/1985 | Koslow | 55/337 |
| 4,848,989 | 7/1989 | Maeda | 55/323 X |
| 4,889,544 | 12/1989 | Hsu | 55/337 X |
| 4,897,094 | 1/1990 | Maeda | 55/323 X |
| 4,925,466 | 5/1990 | Overby | 55/323 X |
| 4,964,898 | 10/1990 | Toda | 55/337 |
| 5,002,593 | 3/1991 | Ichishita et al. | 55/337 X |
| 5,011,519 | 4/1991 | Maeda | 55/323 X |
| 5,145,497 | 9/1992 | Maeda | 55/323 X |

FOREIGN PATENT DOCUMENTS

| | | |
|---|---|---|
| 63-107719 | 7/1988 | Japan . |
| 63-160921 | 10/1988 | Japan . |
| 63-160922 | 10/1988 | Japan . |
| 1479753 | 7/1977 | United Kingdom . |

*Primary Examiner*—Robert Spitzer
*Attorney, Agent, or Firm*—Parkhurst, Wendel & Rossi

[57] ABSTRACT

A filter device for compressed air including first and second filters, wherein the first filter is free from a variation in the filtering efficiency, and does not require periodic replacement of its packing, leading to a reduced maintenance cost of the first filter. The first filter is adapted to separate the liquid and solid particles from the compressed air passing therethrough, while the second filter is adapted to remove or eliminate any residual liquid and solid particles remaining in the compressed air passing therethrough. The first filter includes a deflector for whirling incoming compressed air, the deflector having spiral vanes integrally formed around the axis, and being disposed such that an axial direction of the deflector coincides with the direction of flow of the compressed air through the first filter, so as to whirl the incoming compressed air, whereby any residual liquid and solid particles remaining in the compressed air are separated therefrom, due to a centrifugal force which occurs upon impingement of the compressed air upon the vanes.

17 Claims, 4 Drawing Sheets

FILTER DEVICE FOR COMPRESSED AIR

BACKGROUND OF THE INVENTION

1. Field of the Art

The present invention relates in general to a filter device for compressed air, and more particularly to such a filter device for compressed air which is capable of efficiently separating and removing from the compressed air, liquid particles such as water and oil, and solid particles, which are contained in the compressed air.

2. Discussion of the Prior Art

Generally, conduits for supplying compressed air to various pneumatically operated components used in various factories, atomic plants and medical equipment, for example, are provided with a filter device for removing water, oil and solid matters contained in a stream of the compressed air, for the purpose of protecting the pneumatic components or improving the performance of those components.

One type of such a filter device for compressed air is disclosed in U.S. Pat. No. 4,483,618 to David O. Mann, which is constructed as shown in FIG. 6. This filter device includes two kinds of filter means. Namely, the disclosed filter device includes first filter means 10 having a suitable first packing or pad 20 inside a sleeve 18 thereof, and second filter means 12 having a suitable second packing or pad 22 inside another sleeve 18 thereof. The first and second filter means 10, 12 are disposed parallel with each other on an air-tightly enclosed trap chamber 16 having a suitable volume capacity, so as to extend in the vertical direction from the trap chamber 16, such that each of the first and second filter means communicates with the trap chamber 16. The filter device further has a manifold 14 having an inlet conduit 24 and an outlet conduit 26 for compressed air. The manifold 14 is attached to the first and second filter means 10, 12, such that the inlet and outlet conduits 24, 26 communicate with the first and second filter means 10, 12, respectively. According to this arrangement, the compressed air entering the inlet conduit 24 of the manifold 14 is fed through the first filter means 10 into the trap chamber 16, and then through the second filter means 12 into the outlet conduit 26 of the manifold 14, whereby an air passage for the compressed air is formed through the device. In FIG. 6, the reference numeral 28 designates a drain valve, through which liquid separated from the compressed air and accumulated in the trap chamber 16 is discharged out of the filter device.

Usually, the first packing 20 of the first filter means 10 is a wound wire mesh fabric formed of stainless steel fibers or other metallic materials, while the second packing 22 of the second filter means 12 is a wound fabric mesh formed of cotton fibers, for example. As the compressed air passes through the first filter means 10, vapor and/or liquid particles contained in the compressed air are condensed or coalesced, whereby the vapor and/or liquid particles are separated from the compressed air. Subsequently, the compressed air from which the vapor and/or liquid particles have been separated is introduced into the second filter means 12, so that any liquid and solid particles remaining in the compressed air are adsorbed and vaporized by the second filter means 12. Thus, the amount of the vapor and/or liquid and solid particles contained in the compressed air is minimized.

In the above-described filter device, the wound metal wire fibers used as the first packing 20 of the first filter means 10 suffer from some problems as described below. Namely, it is difficult and cumbersome to wind the metal wire fibers, so that the wound metal fibers are dense over the entirety of the first filter means without considerable gaps or voids left therein. Further, the winding condition of the metal fibers as the first packing tends to vary depending on individual workers who produce the first packing, resulting in a clearance between the inner circumferential surface of the filter sleeve and the outer circumferential surface of the wound packing accommodated therein. Therefore, the compressed air passes through the clearance thus formed or through the gaps which inherently exist in the packing, thereby deteriorating the efficiency of removal of the liquid particles contained in the compressed air. Accordingly, the filtering performance of the filter device as described above is likely to fluctuate.

Further, the first packing made of the wound metal fibers as described above is progressively clogged during a long period of use. It is therefore required to regularly replace the clogged wound packing with a new one. However, this regular replacement undesirably increases the maintenance cost of the filter device since the packing is made of a relatively expensive material, such as stainless steel.

SUMMARY OF THE INVENTION

The present invention was developed in the light of the above situations. It is therefore an object of the invention to provide a filter device for compressed air including first and second filter means, which is free from a variation in the filtering performance of the first filter means and is capable of advantageously reducing the frequency of replacement of the packing, thereby assuring a low maintenance cost of the device.

The above object may be achieved according to the present invention which provides a filter device for compressed air including first filter means adapted to separate liquid and solid particles from the compressed air passing therethrough, and second filter means adapted to remove or eliminate any residual liquid and solid particles remaining in the compressed air passing therethrough, from which the liquid and solid particles have been separated by the first filter means, the filter device being characterized in that the first filter means comprises a deflector for whirling incoming compressed air, the deflector having spiral vanes integrally formed around a circumference of an axis thereof, and being disposed such that an axial direction of the deflector coincides with the direction of flow of the compressed air through the first filter so as to whirl the incoming compressed air, whereby residual liquid and solid particles still remaining in the compressed air are separated therefrom, due to a centrifugal force which occurs upon impingement of the compressed air upon the vanes.

BRIEF DESCRIPTION OF THE DRAWINGS

The present invention will be better understood by reading the following detailed description of a presently preferred embodiment of the invention, when considered in connection with the accompanying drawings in which.

DETAILED DESCRIPTION OF THE PREFERRED EMBODIMENT

Figure 1:
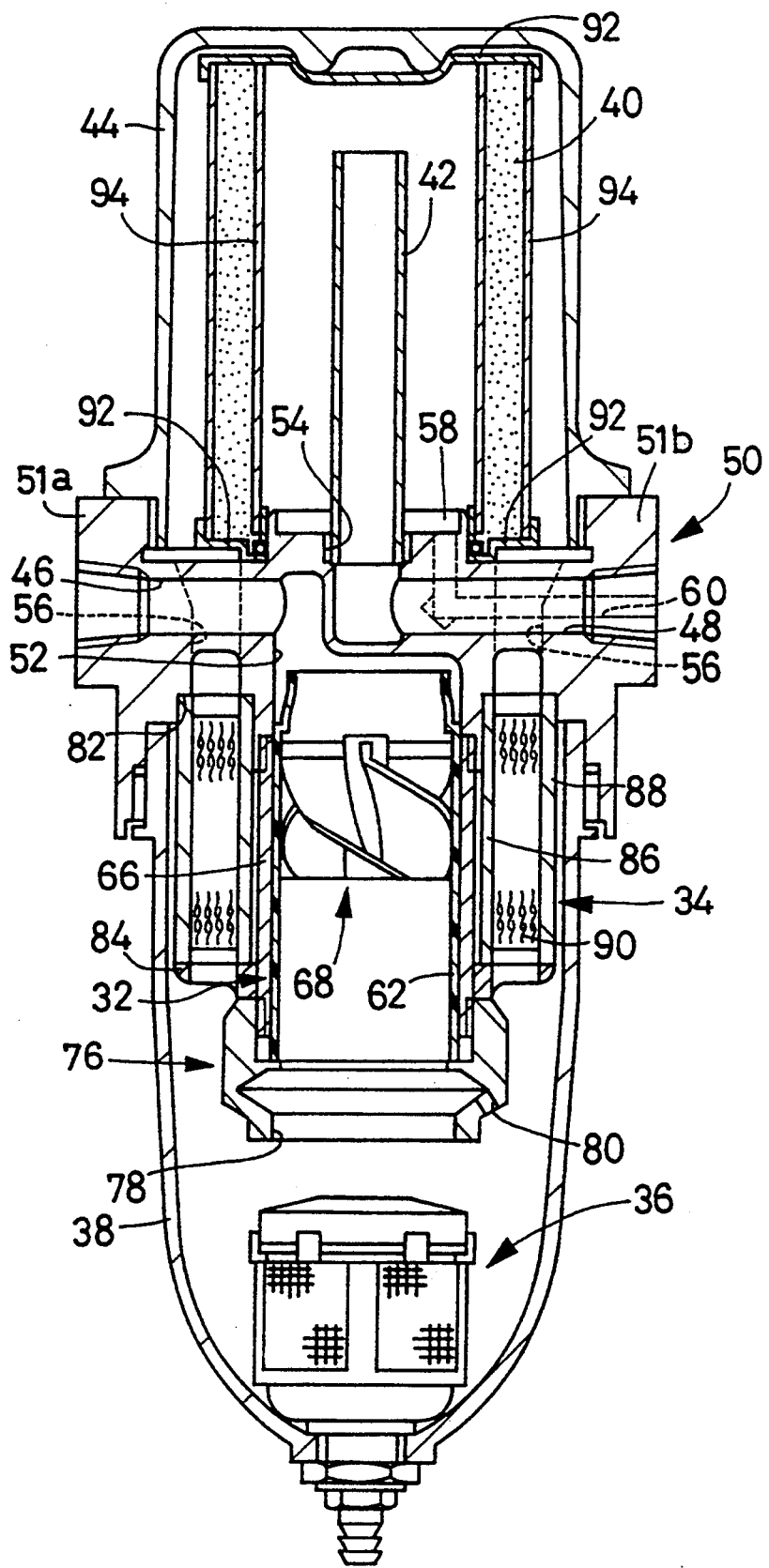
FIG. 1 is an elevational view in longitudinal cross section showing a filter device for compressed air according to one embodiment of the present invention.

Referring first to FIG. 1, there is shown one embodiment of a filter device for compressed air constructed according to the present invention. The filter device includes a lower housing 38, an upper housing 44 and a partition member 50 interposed therebetween. The lower housing 38 accommodates first and second filter means 32, 34, and an automatic draining unit 36, while the upper housing 44 accommodates a mist filter 40 and an air collector 42. The partition member 50 has inlet and outlet passages 46, 48 for the compressed air.

More specifically described, the partition member 50 is a generally circular member with relatively large wall thickness having a first and a second ear portion 51a, 51b which are formed opposite to each other diametrically of the partition member 50. The ear portions 51a, 51b protrude in the radially outward direction of the partition member 50. The inlet passage 46 is open at one of opposite ends thereof on the outer circumference surface of the ear portion 51a while the other end thereof is connected to a lower opening 52 which is open on a central part of the lower surface of the partition member 50. On the other hand, the outlet passage 48 is open at one of opposite ends thereof on the outer circumferential surface of the second ear portion 51b while the other end thereof is connected to an upper opening 54 which is open on a central part of the upper surface of the partition member 50. The partition member 50 further includes intermediate passages 56 formed through a thickness thereof, for fluid communication between the lower housing 38 and the upper housing 44, as described below.

The partition member 50 further has a liquid receiver 58 formed in the central portion of the upper surface thereof, and drain passages 60. The liquid receiver 58 communicates with the upper opening 54 which communicates with the outlet passage 48. The drain passages 60 communicate at one of opposite ends thereof with a tapered bottom surface of the liquid receiver 58, and are open at the other end thereof on the outer circumference surface of the partition member 50, such that the openings of the drain passages 60 are spaced apart from the openings of the inlet and outlet passages 46, 48, by predetermined angular distances in the circumferential direction of the partition member 50.

Figure 2:
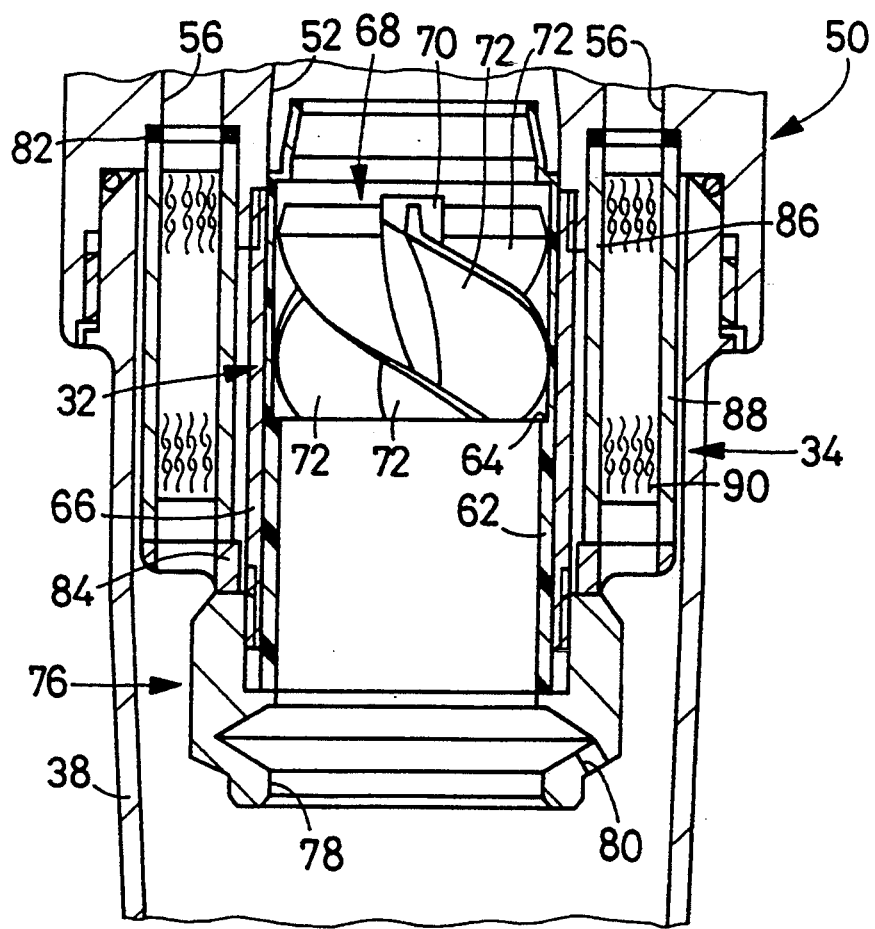
FIG. 2 is a view showing in enlargement first filter means of the filter device of FIG. 1.

The cylindrical lower housing 38 which is closed at one of opposite ends thereof and open at the other end is fluid-tightly attached to a lower portion of the partition member 50, such that the opening of the lower housing 38 is held in sealing abutment with the lower portion of the partition member 50. Thus, the lower housing 38 cooperates with the partition member 50 to define a lower enclosed space. In a radially central portion of an upper part of the lower enclosed space of the lower housing 38, there is disposed the first filter 32, while the second filter 34 is disposed radially outwardly of the first filter 32, as clearly shown in FIG. 2.

The first filter 32 includes a sleeve 62, and a deflector 68 which is accommodated in the sleeve 62, for whirling the incoming compressed air. The first filter 32 is press-fitted in a mounting sleeve 66 having a length shorter than that of the sleeve 62 by a suitable amount, and an inside diameter substantially equal to an outside diameter of the sleeve 62. The sleeve 62 and the deflector 68 are made of a suitable synthetic resin, while the mounting sleeve 66 is made of a suitable metal. The upper end of the sleeve 66 is threaded to the lower end of the lower opening 52 of the partition member 50, whereby the first filter 32 is secured to the partition member 50. A nut 76 is screwed on the lower end portion of the outer circumferential surface of the mounting sleeve 66, so that the lower end portion of the sleeve 62 is supported at an inner flange portion of the nut 76 formed at an axially intermediate portion of the inner circumferential surface of the nut 76.

Figure 3:
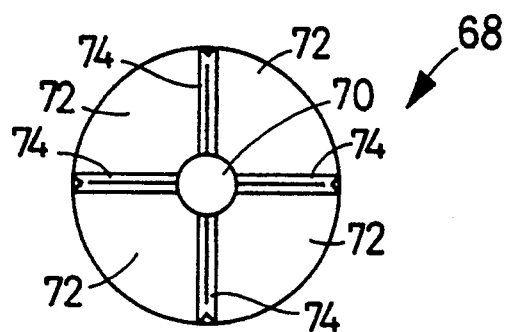
FIG. 3 is a top plan view of a deflector of the first filter means.
Figure 4:
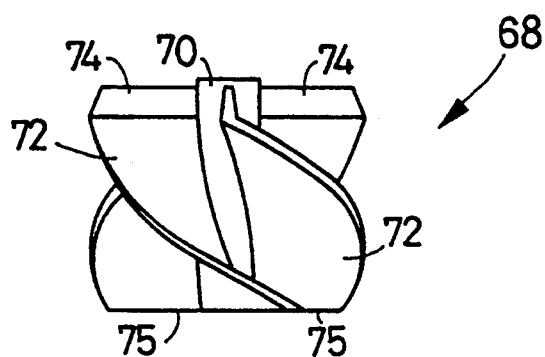
FIG. 4 is a front elevational view of the deflector of FIG. 3.
Figure 5:
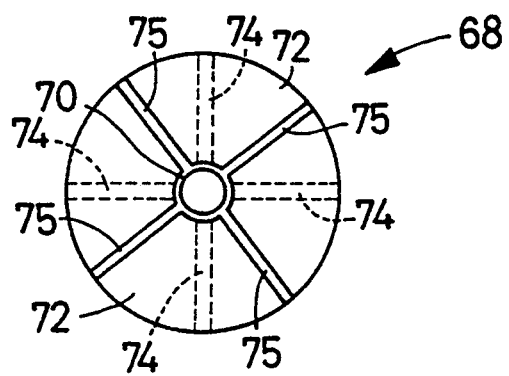
FIG. 5 is a bottom plan view of the deflector of FIG. 3.

As shown in FIGS. 3-5, the deflector 68 has an axis 70 and four spiral vanes 72 which are integrally formed around the outer circumference of the axis 70, in an equally spaced-apart relation with each other. Each vane 72 is spiraled such that its lower end 75 is offset 130° around the axis with respect to its upper end 74. The deflector 68 is fixed to the sleeve 62 such that the lower end of the deflector is supported by and held in abutting contact with an annular shoulder portion 64 formed at a substantially axially middle portion of the inner cylindrical surface of the sleeve 62. The deflector 68 is disposed within the sleeve 62 such that the axial direction of the deflector 68 coincides with the direction of flow of the compressed air through the first filter 32.

In the thus constructed filter device, the compressed air entering the inlet passage 46 of the partition member 50 is directed into the interior of the first filter 32, and whirled by the vanes 72 of the deflector 68, whereby the liquid and solid particles contained in the compressed air are effectively thrown in the radially outward direction of the sleeve 62 owing to a centrifugal force which occurs upon impingement of the compressed air upon the vanes. The separated liquid and solid particles which have been carried to the inner wall of the sleeve 62 fall straight down along the surface of an inner bore 78 formed in the nut 76 screwed on the lower portion of the mounting sleeve 66. However, some portion of the separated particles is fed radially outside the nut 76 through a plurality of through-holes 80, which are formed through the cylindrical wall of the nut 76 such that the through-holes 80 are inclined downwardly as the through-holes 80 extend radially outwardly of the nut 76. The liquid and solid particles are thus accumulated in a lower portion of the enclosed space of the lower housing 38, and eventually discharged out of the filter device by the draining unit 36 accommodated in a bottom portion of the enclosed space. As the draining unit 36 of the present invention, a device disclosed in U.S. Pat. No. 5,011, 519 to Maeda may be preferably employed. However, the draining unit is not limited to the this device, but other known draining devices may also be employed in the present filter device.

The first filter 32 constructed as described above assures consistent filtering of the filter device, without a variation in the filtering performance due to poor or inadequate winding condition of the wound packing, in contrast with the known filter device having the first filter filled with the wound packing consisting of wire mesh fabrics formed of stainless steel fibers or other metallic materials. Further, the first filter 32 is free from a problem of clogging of the wound packing as experienced in the conventional device, which advantageously eliminates the need for periodic replacement of the wound packing with new ones as required in the conventional device. The present first filter 32 assures a considerably reduced manufacturing cost of the device, since the instant first filter 32 can be easily made of a relatively inexpensive material, such as a resin.

On the other hand, the second filter 34 consists of an inner and an outer tube 86, 88 which are disposed in concentric relation with each other and which define an annular space therebetween filled with a second packing 90 consisting of wound mesh fabric made of cotton fibers. The inner tube 86 has an inside diameter larger than the outside diameter of the mounting sleeve 66 of the first filter 32 by a suitable amount. The outer tube 88 has a diameter larger than that of the inner tube 86 by a suitable amount and has substantially the same length as the inner tube 86. The second filter 34 is secured to the partition member 50 such that the upper end of the second filter 34 is held in abutting contact with an annular shoulder 82 of the partition member 50 which communicates with a lower portion of each intermediate passage 56, while the lower end of the second filter 34 is supported by the nut 76 with an annular support member 84 interposed therebetween. The support member 84 has a plurality of holes formed therethrough and equally spaced apart from each other in the circumferential direction thereof. In this arrangement, the first filter 32 projects downwardly at its lower end from the lower end of the second filter 34 by a predetermined amount. The compressed air from which the liquid and solid particles have been separated by passage through the first filter 32 is directed into and passed through the thus constructed second filter 34, whereby any residual liquid and solid particles remaining in the compressed air is adsorbed and vaporized in and by the second filter 34.

The upper housing 44 which is closed at one of its opposite ends is fluid-tightly attached at the other open end to an upper portion of the partition member 50 such that the opening of the upper housing 44 is threaded to the partition member 50, so as to provide an upper enclosed space. In the thus formed enclosed space, the annular mist filter 40 is disposed substantially concentrically with the first and second filters 32, 34 with its upper and lower ends supported by respective upper and lower support plates 92, whereby the mist filter 40 is fluid-tightly attached at its lower end to an outer peripheral portion of the liquid receiver 58 formed in the central portion of the upper surface of the partition member 50. This arrangement of the mist filter 40 defines an inner space and an outer annular space within the enclosed space of the upper housing 44. The outer annular space of the mist filter 40 is brought into communication with the lower enclosed space of the lower housing 38 through the intermediate passages 56 of the partition member 50.

The mist filter 40 of the present invention may be replaced with other known mist filters consisting of soft or hard polyurethane foams, sintered resins or glass fibers, for instance, which have minute pores, provided the mist filter has an annular porous structure. In the thus constructed mist filter 40, the compressed air is forced to flow through the porous structure from the outside to the inside, so that any residual vapor and/or liquid and solid particles remaining in the compressed air are trapped by the porous structure of the mist filter 40. Thus, the remaining vapor and/or liquid and solid particles are removed or eliminated from the compressed air. In the present embodiment, each of the inner and outer circumferential surfaces of the mist filter 40 is covered with a suitable filter screen 94 consisting of a metallic material of network structure (not shown). However, the mist filter may not have such screens.

In a substantially central portion of the inner space of the mist filter 40, the cylindrical air collector 42 having a suitable length and a relatively small wall thickness is fluid-tightly connected at one of its opposite ends to the upper opening 54 which is open in the central portion of the liquid receiver 58 of the partition member 50, so as to extend in the vertical direction from the opening 54. This arrangement effectively prevents the liquid particles separated from the compressed air and trapped by the porous structure of the mist filter 40, from entering the outlet passage 48.

In the thus constructed filter device, the compressed air entering the inlet passage 46 of the partition member 50 is directed into the interior of the first filter 32, and forced to be whirled by the deflector accommodated therein, whereby liquid particles of water or oil and solid particles contained in the compressed air are effectively separated therefrom due to the centrifugal force which occurs upon impingement of the compressed air upon the vanes. The thus separated liquid and solid particles are carried into the lower portion of the lower housing 38, and eventually discharged outside the device through the draining unit 36.

Subsequently, the compressed air from which the liquid and solid particles have been separated by the first filter 32 is directed into the second filter 34. The liquid particles remaining in the compressed air are adsorbed by the second packing 90 of the second filter 34, or vaporized due to turbulence of the air flow during passage through the packing 90, while the residual solid particles in the compressed air are trapped by the packing 90 during passage of the compressed air therethrough. The compressed air which has passed through the second packing 90 is then introduced into the outer annular space of the upper housing 44 through the intermediate passages 56 formed through the partition member 50, and passes through the porous structure of the mist filter 40 into the inner space of the upper housing 44, whereby any still remaining liquid and solid particles in the compressed air are trapped by the porous structure of the mist filter 40. Accordingly, the purified compressed air which is free of the liquid particles of water or oil, and the solid particles is directed to the outlet conduit via a bore of the air collector 42 open on the inner space of the mist filter 40 at one of opposite ends thereof which is remote from the partition member 50, the upper opening 54 of the partition member 50, and the outlet passage 48.

The liquid particles trapped during passage of the compressed air through the mist filter 40 gradually fall within the interior of the mist filter 40, and are temporarily stored in the bottom portion thereof. The stored liquid is then discharged out of the mist filter 40, and collected within the liquid receiver 58 formed in the upper surface of the partition member 50. The liquid is eventually discharged out of the filter device through the drain passages 60 open in the bottom of the liquid receiver 58. In this arrangement, the provision of the air collector 42 effectively prevents the liquid from entering the outlet passage 48. Although the mist filter 40 and air collector 42 are not essential components in practicing the present invention, it is to be understood that the provision of these components makes it possible to effectively separate and remove the liquid particles contained in the compressed air.

In the filter device constructed according to the present invention as described above, the liquid and solid particles are efficiently removed or eliminated as the compressed air passes through the first filter 32, second filter 34 and mist filter 40. In particular, the first filter 32 used in the present embodiment exhibits high filtering performance free from a variation, thereby assuring stabilized efficiency of separation and removal of the liquid particles. The first filter 32 is further advantageous over the conventional filter device in that it does not require periodic replacement of the packing as required for the conventional first filter, whereby the maintenance cost of the filter device is favorably reduced.

The applicant of the present invention conducted an experiment for the purpose of comparing the filtering efficiency of the present and conventional filter devices, using a filter device, as shown in FIG. 1, having the first filter 32 which employs the deflector 68 for whirling incoming compressed air, and a conventional filter device having a first filter whose interior is filled with the wound stainless steel mesh fibers. The experiment was conducted at an inlet pressure of the compressed air of 3 kg/cm$^2$ and at a flow rate of the compressed air of 350 l./min. It was confirmed from the experiment that the present filter device exhibited substantially the same filtering efficiency as the conventional filter device.

While there has been described one embodiment of the present invention in detail, it is to be understood that the invention is not limited to the details of the illustrated embodiment, but may be embodied with various changes, modifications and improvements which occur to those skilled in the art, without departing from the spirit of the invention.

Figure 6:
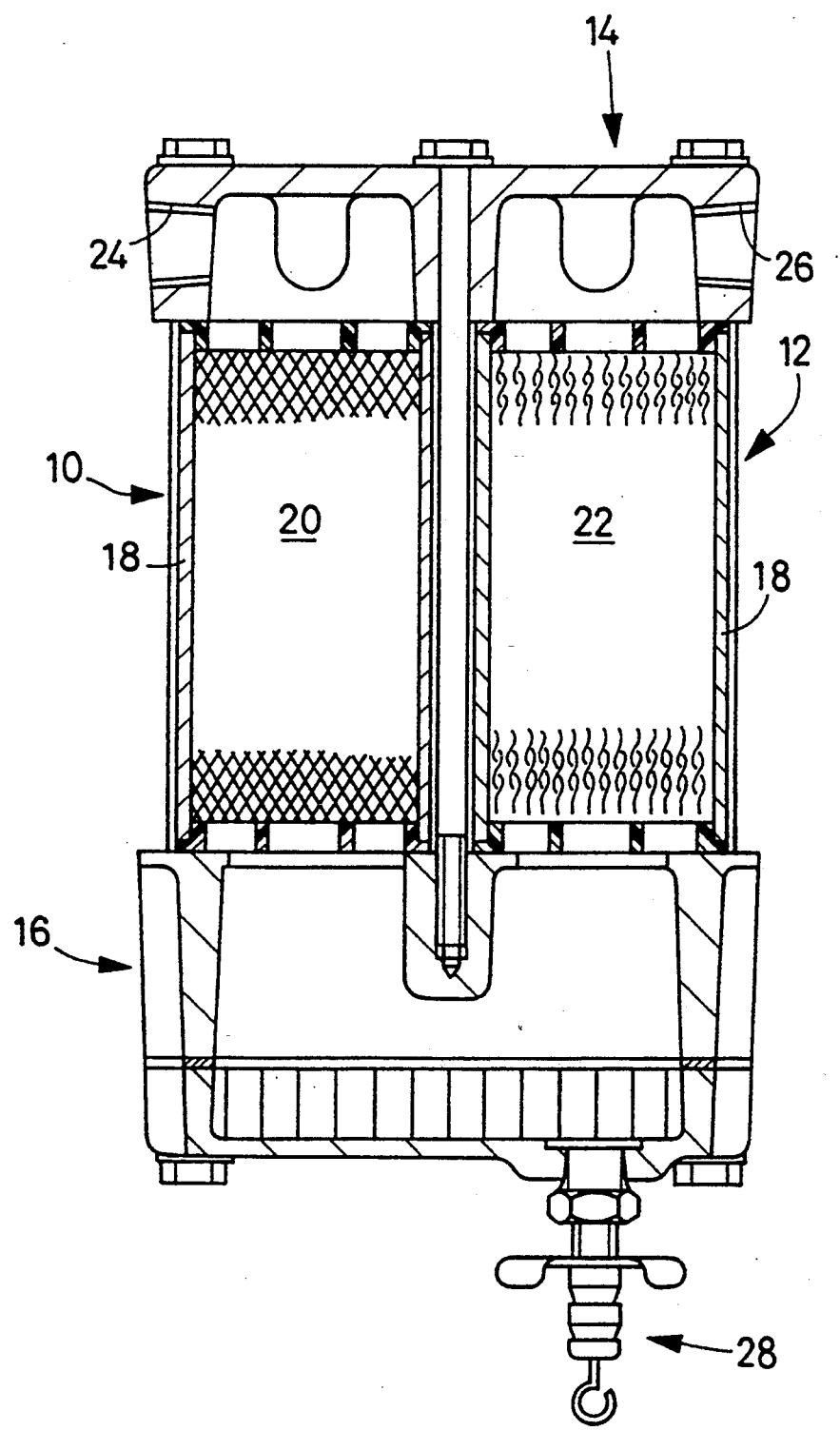
FIG. 6 is an elevational view in longitudinal cross section showing one example of a conventional filter device.

While the illustrated filter device has the first and second filters which are disposed concentrically with each other, the principle of the present invention is also applicable to various other types of the filter device, such as a filter device of FIG. 6, wherein the first and second filters are disposed side by side parallel to each other, with their axes being laterally spaced apart from each other.

INDUSTRIAL UTILITY

As is clearly understood from the above description, the filter device for compressed air constructed according to the present invention is adapted to remove or eliminate the liquid and solid particles from the compressed air during passage of the compressed air through the first and second filters. The present filter device employs, as the first filter, the deflector having spiral vanes integrally formed around the axis for the purpose of whirling the incoming compressed air. This arrangement makes it possible to effectively separate the liquid and solid particles from the compressed air, due to the centrifugal force which occurs upon impingement of the compressed air upon the vanes. Therefore, the present first filter is free from a variation in the filtering performance as experienced in the conventional device having a first filter whose interior is filled with the wound packing made of metallic fibers. Consequently, the present filter device assures consistent filtering efficiency, that is, stable separation and removal of the liquid and solid particles from the compressed air. Further, since the instant first filter having the deflector does not suffer from the problem of clogging of the wound packing as in the conventional first filter, the present filter device eliminates the need for the conventionally required periodic replacement of the clogged wound packing, and the required maintenance time of the filter device is considerably reduced. Further, the cost of manufacture of the filter device is reduced by the use of the deflector made by molding of a relatively inexpensive synthetic resin, for example.

What is claimed is:

1. A filter device for compressed air, comprising:
   first filter means for separating liquid and solid particles from incoming compressed air passing therethrough, said first filter means including a deflector having an axis which coincides with a direction of flow of incoming compressed air through said first filter means, and a plurality of vanes which are disposed around said axis for whirling the incoming compressed air, to thereby separate said liquid and solid particles from said compressed air, under a centrifugal force which occurs upon impingement of said compressed air upon said plurality of vanes;
   second filter means for removing any residual liquid and solid particles remaining in the compressed air passing therethrough, after the compressed air has passed through said first filter means;
   a lower housing in which said first and second filter means are accommodated;
   an upper housing communicating with said lower housing;
   a partition member disposed between said lower and upper housings, and having an inlet passage through which said incoming compressed air is directed to said deflector of said first filter means, and an outlet passage through which the compressed air filtered by said firsthand second filter means is delivered out of the filter device; and
   a mounting sleeve disposed in said lower housing and secured to said partition member, for supporting said deflector such that said axis of the deflector is aligned with an axis of said mounting sleeve.

2. A filter device according to claim 1, wherein said plurality of vanes of said deflector consist of spiral vanes each having opposite ends which are offset from each other in a circumferential direction along a circle which has a center on said axis.

3. A filter device according to claim 2, wherein said spiral vanes consist of four spiral vanes which are equally spaced apart from each other in said circumferential direction.

4. A filter device according to claim 1, wherein said deflector comprises a synthetic resin.

5. A filter device according to claim 1, wherein said deflector further comprises a sleeve in which said deflector is fixedly accommodated such that said axis of the deflector is aligned with an axis of said sleeve.

6. A filter device according to claim 5, wherein said sleeve of said deflector is disposed radially inwardly of said second filter means.

7. A filter device according to claim 1, wherein said second filter means includes a packing consisting of a wound fabric material.

8. A filter device according to claim 7, wherein said wound fabric material consists of cotton fibers.

9. A filter device according to claim 1, further comprising a draining device accommodated in a bottom portion of said lower housing, for discharging a liquid consisting of said liquid particles separated from said compressing air by said first and second filter means.

10. A filter device according to claim 1, wherein said upper housing communicates with said outlet passage.

11. A filter device according to claim 10, further comprising a mist filter having an annular porous structure and disposed within said upper housing, said annular porous structure communicating with said second filter means through said partition member, so that said compressed air flowing from said second filter flows through said porous structure form an outside into an inside of said porous structure, for separation of liquid particles still remaining in said compressed air while said compressed air is flowing through said porous structure.

12. A filter device according to claim 11, wherein said partition member has a liquid receiver formed in an upper surface thereof and communicating with an inner space defined by an inner circumferential surface of said annular porous structure of said mist filter, and a drain passage communicating with said liquid receiver, so that a liquid consisting of the liquid particles separated by said mist filter is discharged out of the filter device through said drain passage.

13. A filter device according to claim 11, further comprising an air collector disposed within an inner space defined by an inner circumferential surface of said annular porous structure of said mist filter, said air collector communicating with said outlet passage for delivering the compressed air after being filtered by said first and second filter means and said mist filter.

14. A filter device according to claim 1, wherein said first filter means further comprises a resin sleeve in which said deflector is fixedly accommodated, said resin sleeve being fixedly disposed in said mounting sleeve.

15. A filter device according to claim 14, further comprising a nut screwed on a lower portion of said mounting sleeve, such that said resin sleeve communicates, through said nut, with a space in said lower housing to which said second filter means is exposed.

16. A filter device according to claim 15, wherein said nut cooperates with said mounting sleeve and said partition member to support said second filter means.

17. A filter device according to claim 15, wherein said nut has holes through which said liquid and solid particles separated from said compressed air by said deflector are fed out of a passage of said compressed air leading to said second filter means.

* * * * *